United States Patent [19]

Koepe

[11] Patent Number: 5,110,063
[45] Date of Patent: May 5, 1992

[54] COILING MACHINE FOR STRIP-SHAPED MATERIAL, MORE PARTICULARLY FOR AN EDGE STRIP FORMED IN THE TRIMMING OF STEEL STRIPS

[75] Inventor: Wilfried Koepe, Wiehagen 104, D-4712 Werne, Fed. Rep. of Germany

[73] Assignee: Wilfried Koepe, Werne, Fed. Rep. of Germany

[21] Appl. No.: 599,339

[22] Filed: Oct. 17, 1990

[30] Foreign Application Priority Data

Nov. 15, 1989 [DE] Fed. Rep. of Germany ....... 3937992

[51] Int. Cl.[5] ............ B21C 47/02; B65H 18/10
[52] U.S. Cl. ............................................. 242/78.1
[58] Field of Search ............ 242/78.1, 78, 79, 81, 242/67.1 R

[56] References Cited

U.S. PATENT DOCUMENTS

| | | | |
|---|---|---|---|
| 2,066,377 | 1/1937 | Wean et al. ............ | 242/78 X |
| 2,420,936 | 5/1947 | Davis ............ | 242/81 |
| 2,829,845 | 4/1958 | Loop ............ | 242/81 |
| 3,132,820 | 5/1964 | Toll ............ | 242/78.1 |
| 4,105,172 | 8/1978 | Petros ............ | 242/78.1 |

Primary Examiner—John M. Jillions
Attorney, Agent, or Firm—Sprung Horn Kramer & Woods

[57] ABSTRACT

The invention relates to a coiling machine for strip-shaped material, more particularly for an edged strip formed in the trimming of steel strip. A coiling shaft 1 disposed between two side discs 2, 3 mounted in bearing blocks, 6, 9 is so mounted axially displaceably in a hollow shaft 8 bearing one of the two side discs 3 that the hollow shaft can be drawn out from the zone between the side discs 2, 3. The coiling shaft 1 is also coupled via a more particularly positive coupling 22 for transmitting torque to the directly driven hollow shaft 8. The other side disc 2 is either coupled via driving elements directly to the drive 11 for the hollow shaft 8 or driven by a separate drive.

3 Claims, 1 Drawing Sheet

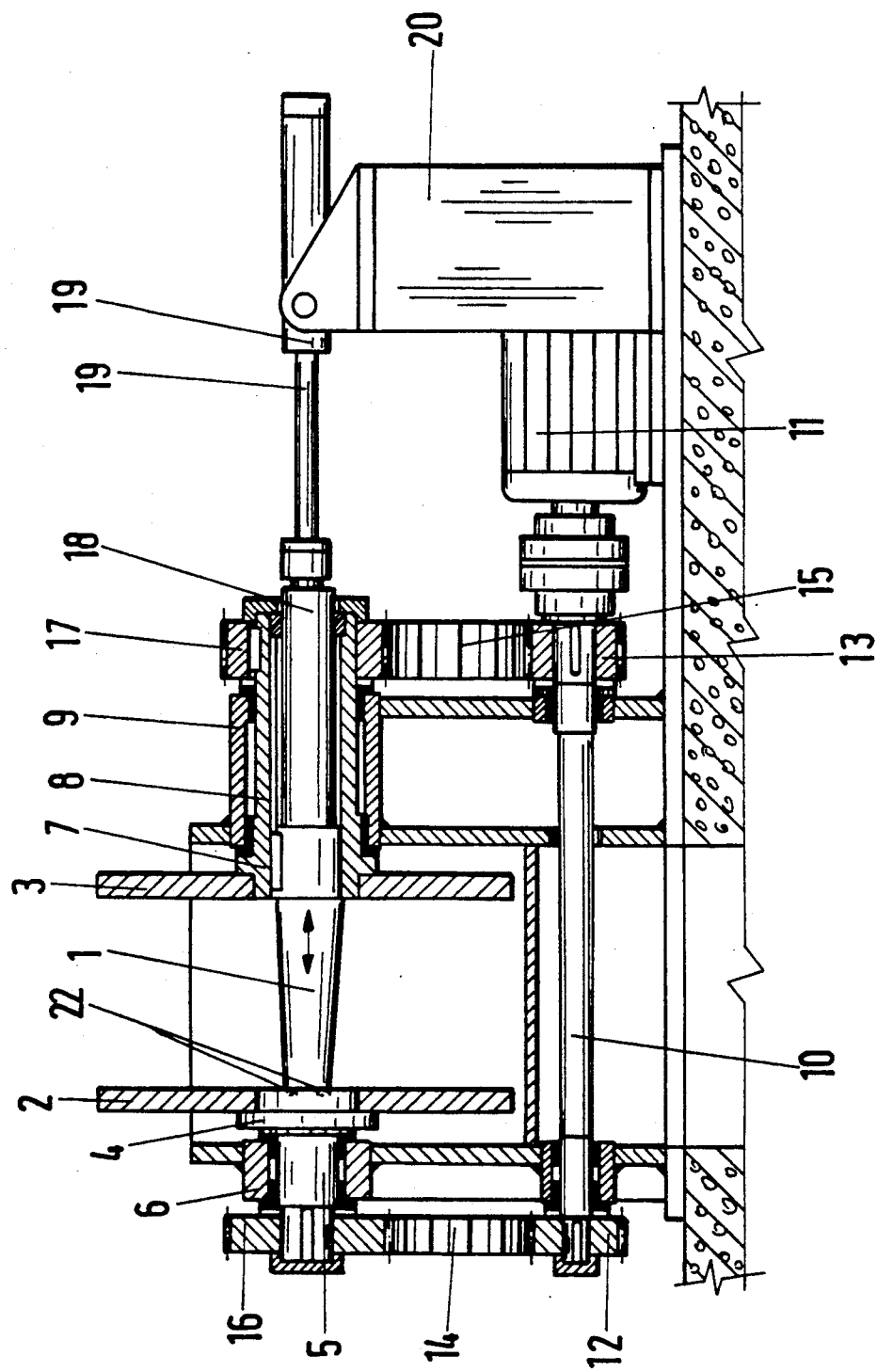

COILING MACHINE FOR STRIP-SHAPED MATERIAL, MORE PARTICULARLY FOR AN EDGE STRIP FORMED IN THE TRIMMING OF STEEL STRIPS

BACKGROUND OF THE INVENTION

The invention relates to a coiling machine for strip-shaped material, more particularly for an edge strip formed in the trimming of steel strips, comprising an axially adjustable driven coiling shaft and driven side discs rotatably mounted in lateral bearing blocks, the coiling shaft being mounted axially displaceably in a directly driven axially fixed hollow shaft mounted in one of the lateral bearing blocks and coupled via a more particularly positive coupling for transmitting torque to the hollow shaft that the coiling shaft, so can be drawn out of the zone between the side discs, and the side disc adjacent the hollow shaft being fixed to the hollow shaft.

In a coiling machine of the kind specified known from practice, the side disc remote from the hollow shaft is connected via a positive plug-in coupling to the axially displaceable coiling shaft. Such a coiling machine has the advantage that the coiled edge scrap can be ejected merely by drawing the coiling shaft out of the zone between the side discs, so that no assembly work on the side discs is required. As practical operation has shown, that advantage is offset by the disadvantage that the coupling between the coiling shaft and the side disc remote from the hollow shaft is subject to heavy wear, more particularly because in the case of coiling machines having a large disc diameter the considerable inertial mass of the side disc must be accelerated and braked via the coupling. However, not only the coupling, but the side disc also is itself subject to heavy wear, since after the start of coiling the torque is substantially transmitted between the side disc and the lateral edges of the strip to be coiled. If the coupling is no longer effective, friction occurs between the side disc and the edges of the coiled edge scrap, resulting in wear.

SUMMARY OF THE INVENTION

It is an object of the invention to provide a coiling machine of the kind specified in which driving synchronism is permanently ensured between the coiling shaft and the two side discs.

This problem is solved according to the invention by the feature that the other side disc, remote from the hollow shaft, is driven either directly by the drive driving the hollow shaft or by a further drive.

In the coiling machine according to the invention, therefore, the other side disc remote from the hollow shaft is driven directly, and no longer via a coupling between the coiling shaft and the side disc, which at this place cannot be constructed large enough, for reasons of space, to permanently withstand the loadings. It is true that due to the direct drive the cost of manufacture is higher, but in the long run expenditure is nevertheless reduced, since the cost of maintenance is eliminated.

Particularly advantageously in addition a more particularly positive torque-transmitting clutch is provided between the coiling shaft in the operative position and the other side disc. This means that the direct drive can be of comparatively small dimensions. It need merely be designed for the differential torque which in the case of the conventional coupling, provided exclusively between the coiling shaft and the other side disc, led to their premature wear due to overloading, while in the case of two separate drives the direct drive must be designed for speed synchronization.

According to a further feature of the invention the common drive for the hollow shaft and the other side disc has a driving shaft which is disposed parallel with the coiling shaft and is drivably connected via driving elements on the one hand to the hollow shaft and on the other hand to the other side disc.

An embodiment of the invention will now be described in greater detail with reference to the accompanying drawing.

BRIEF DESCRIPTION OF THE DRAWING

The drawing shows diagrammatically in axial section a coiling machine for the edge scrap formed in the trimming shearing of steel strips.

DETAILED DESCRIPTION OF THE INVENTION

A coiling machine has a conical coiling shaft 1 and two side discs 2, 3 disposed at the ends of the coiling shaft 1. The side disc 2 is attached to a flange 4 of a driving shaft 5 mounted rotatably but axially non-displaceably in a bearing block 6. The side disc 3 is attached to a flange 7 of a hollow shaft 8 which acts as a driving shaft and is mounted rotatable but axially fixed in a bearing block 9. Mounted in the bearing blocks 6, 9 is a driving shaft 10 which is disposed parallel with the coiling shaft 1 and which is driven by a driving motor 11 and is drivably connected to the side discs 2, 3 via driving elements, namely driving rollers 12, 13 disposed on the driving shaft 10 and driving belts 14, 15 and driving rollers 16, 17 on the driving shaft 5 and the hollow shaft 8 respectively.

Via an intermediate member 18 in the hollow shaft 8 the conical coiling shaft 1 is mounted axially displaceably in the hollow shaft 8, a cylinder-and-piston unit 19 retained in an upright 20 acting as an adjusting device, so that the conical coiling shaft 1 can be completely drawn out of the zone between the side discs 2, 3. A positive coupling in the form of an adjusting spring is provided between the hollow shaft 8 and the coiling shaft 1. When the hollow shaft 8 is driven, therefore, the coiling shaft 1 is also entrained. At its end the coiling shaft 1 has dogs 22 engaging positively in matching recesses in the flange 4. As a result, a torque is transmitted from the drive 11 not only directly via the driving shaft 10 to the side disc 2, but also indirectly via the hollow shaft 8 and the coiling shaft 1 to the side disc 3. This distribution of the torque to be transmitted can be taken into account when dimensioning the two parallel drives, with the object of ensuring that the direct drive via the driving shaft 10 is as small as possible, but that the coupling between the coiling shaft 1 and the side disc 2 is not overloaded.

I claim:

1. A coiling machine for strip-shaped material, comprising: lateral bearing blocks, axially fixed side discs rotatably mounted on the bearing blocks; a coiling shaft; an axially fixed hollow shaft mounted in one of the bearing blocks for rotation and connected to one of the side discs for rotation therewith; means mounting the coiling shaft for axial displacement in the hollow shaft between an operative position wherein the coiling shaft is disposed between the two side discs and a second position wherein the coiling shaft is within the hollow shaft and removed from between the two side discs; means for directly driving the hollow shaft; means directly driving the other of the side discs; and means for positively coupling the coiling shaft to the hollow shaft.

2. The coiling machine according to claim 1, further comprising means for positively coupling the coiling shaft to the other of the side discs when the coiling shaft is in the operative position to transmit torque to the other of the side discs via the hollow shaft and the coiling shaft.

3. The coiling machine according to claim 1, wherein the means for directly driving the hollow shaft and the means for directly driving the other of the side discs comprise a common drive with a drive shaft disposed parallel to the coiling shaft and driving elements connecting the drive shaft to the hollow shaft and to the other of the side discs.

* * * * *